(12) United States Patent
Jia

(10) Patent No.: US 7,483,564 B2
(45) Date of Patent: *Jan. 27, 2009

(54) METHOD AND APPARATUS FOR THREE-DIMENSIONAL SHADOW LIGHTENING

(75) Inventor: Charles Chi Jia, San Diego, CA (US)

(73) Assignee: Hewlett-Packard Development Company, L.P., Houston, TX (US)

(*) Notice: Subject to any disclaimer, the term of this patent is extended or adjusted under 35 U.S.C. 154(b) by 960 days.

This patent is subject to a terminal disclaimer.

(21) Appl. No.: 10/984,591

(22) Filed: Nov. 8, 2004

(65) Prior Publication Data

US 2005/0093865 A1 May 5, 2005

Related U.S. Application Data

(63) Continuation of application No. 09/956,500, filed on Sep. 19, 2001, now Pat. No. 6,839,459.

(51) Int. Cl.
G06K 9/00 (2006.01)
(52) U.S. Cl. .................................... 382/154
(58) Field of Classification Search ............... 382/103, 382/154, 199, 316; 345/418, 419
See application file for complete search history.

(56) References Cited

U.S. PATENT DOCUMENTS

| | | | |
|---|---|---|---|
| 4,737,921 A * | 4/1988 | Goldwasser et al. | ........ 345/421 |
| 5,901,253 A | 5/1999 | Tretter | |
| 6,246,788 B1 | 6/2001 | Pattikonda et al. | |
| 6,285,780 B1 * | 9/2001 | Yamakita et al. | ............ 382/110 |
| 6,430,320 B1 | 8/2002 | Jia et al. | |
| 6,603,580 B1 | 8/2003 | Taillie | |
| 6,757,081 B1 | 6/2004 | Fan et al. | |
| 6,839,459 B2 | 1/2005 | Jia | |

FOREIGN PATENT DOCUMENTS

| | | |
|---|---|---|
| DE | 19853632 | 7/1999 |
| EP | 0 731 596 | 9/1996 |
| EP | 0 566 300 | 12/1996 |
| JP | 04-240839 | 8/1992 |
| JP | 06-276368 | 9/1994 |
| JP | 10-224615 | 8/1998 |
| JP | 2000-261653 | 9/2000 |

OTHER PUBLICATIONS

English translation of Japanese Office Action dated Feb. 28, 2006.

* cited by examiner

Primary Examiner—Daniel G Mariam

(57) ABSTRACT

A method of image processing is provided, the method including acquiring a digital image having a three-dimensional shadow, determining a boundary of the three-dimensional shadow, and lightening the three-dimensional shadow within the boundary.

27 Claims, 5 Drawing Sheets

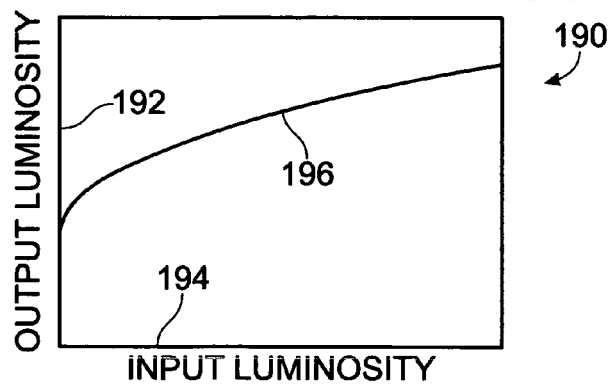
Fig. 11 LIGHTENING FUNCTION FOR PERIMETER AND CENTER WITH TEXT
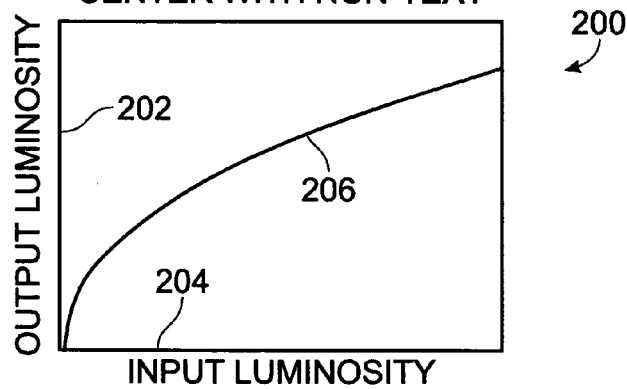
Fig. 12 LIGHTENING FUNCTION FOR CENTER WITH NON-TEXT
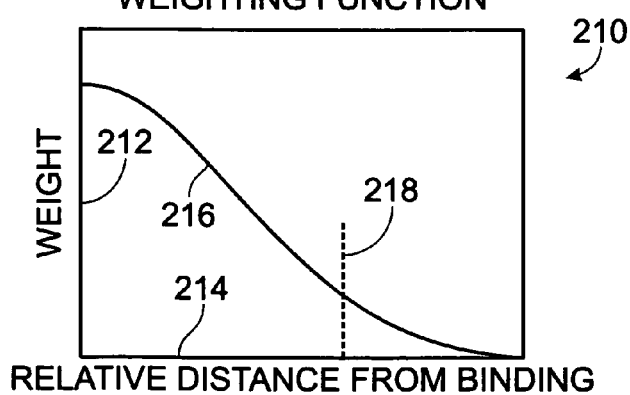
Fig. 13 WEIGHTING FUNCTION

METHOD AND APPARATUS FOR THREE-DIMENSIONAL SHADOW LIGHTENING

CROSS-REFERENCE TO RELATED APPLICATION

This is a continuation of application Ser. No. 09/956,500 filed on Sep. 19, 2001, now U.S. Pat. No. 6,839,459 which is hereby incorporated by reference.

FIELD OF THE INVENTION

The present invention relates generally to image processing, and more particularly, to methods and apparatus for lightening of three-dimensional shadows in scanned digital images.

BACKGROUND OF THE INVENTION

Various types of image scanning devices that may be employed to create digital images are known. For example, flatbed scanners that may be connected to a computing system are typically employed in such a manner. Additionally, office copy systems, or traditional photocopiers, may be capable of scanning a document to create a digital image. Such copy systems may be connected to a computer network. In such a situation, digital image information may be copied to an electronic storage device, such as a file server, via the computer network.

Due to various factors, which may include scan surface area and scanner lens focal length, scanning (for example, books or magazines) may produce unwanted artifacts in such scanned images. Such artifacts may include three-dimensional (3D) shadows that appear in the scanned image around the perimeter of the book or magazine and/or in the vicinity of the binding due to relative distance of pages from the scan surface and/or light reflection resulting from binding curvature. Additionally, 3D artifacts from the fanning of pages of the book or magazine may be present in a corresponding digital image. Such image artifacts are typically undesired as they are aesthetically displeasing. Further, printing such images may use unnecessary toner or ink, which may, in turn, increase per page print costs for such images. Therefore, techniques for reducing the presence of such 3D shadows and artifacts in digital images are desirable.

SUMMARY OF THE INVENTION

A method of image processing is provided, the method including acquiring a digital image having a three-dimensional shadow, determining a boundary of the three-dimensional shadow, and lightening the three-dimensional shadow within the boundary.

BRIEF DESCRIPTION OF THE FIGURES

FIG. 11 is a graph illustrating a lightening function that may be employed with the methods illustrated in FIGS. 6, 8 and 10;

FIG. 12 is a graph illustrating an alternative lightening function that may be employed with the methods illustrated in FIGS. 6, 8 and 10;

FIG. 13 is a graph illustrating a weighting function that may be employed with the methods illustrated in FIGS. 6 and 10.

DETAILED DESCRIPTION OF THE INVENTION

Figure 1:
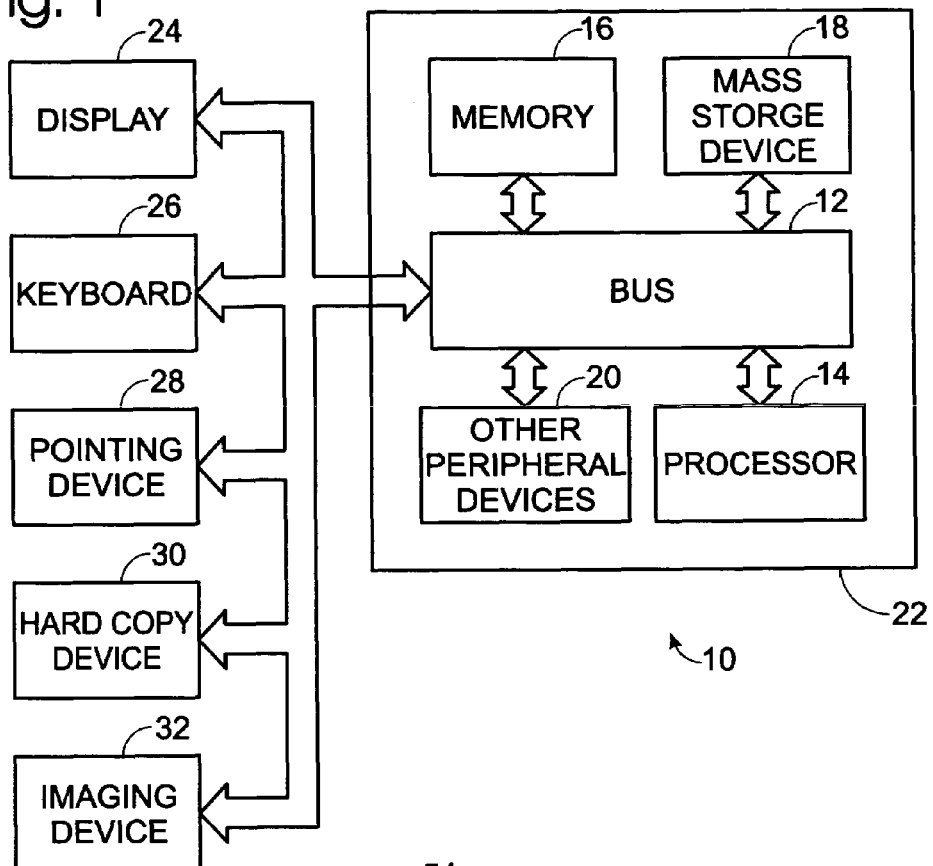
FIG. 1 is a block diagram illustrating a computer system that may implement an image processing system in accordance with an embodiment of the present invention.

Referring first to FIG. 1, a computing system that may be employed to implement an image processing system 10 is illustrated in block diagram form. Computing system 10 includes bus 12 that may control and convey electronic communication between the various components of computing system 10. In this regard, processor 14 is coupled with bus 12 and may provide information-processing functions for computing system 10. Also coupled with bus 12 are memory 16, mass storage device 18 and other peripheral devices 20.

Memory 16 may include cache memory and main memory. Cache memory is typically used for short-term purposes while executing certain functions, while main memory may be used for longer-term storage of electronic data that may be employed by processor 14 or other components of computing system 10 during operation. Cache memory may be implemented with, for example, static random access (SRAM), while main memory is typically implemented using one of various types of dynamic RAM (DRAM). Cost is one factor used to determine the specific memory implementation techniques employed.

Mass storage device 18 may include a hard disk drive, a compact disk (CD) drive or a digital versatile disk (DVD) drive. Such devices may be read/write, such as hard disk drives, or read only such as CD or DVD drives. Alternatively, CD or DVD writer drives may be employed. Mass storage device 18 typically includes, for example, application programs, or other content that may be executed or displayed to have computing system 10 perform certain functions such as word processing or displaying video.

Other peripheral devices 20 may include, for example, a network interface card, a phone line modem, a digital subscriber line modem, a video capture card or any number of other devices. Peripheral devices 20, along with bus 12, processor 14, memory 16 and mass storage device 18 are typically contained in a case 22 when employed in computer system 10. Such cases may vary depending on the particular system. Two types of cases that may be employed are "towers" and "desktop" cases.

Computing system 10 may further include any number of input/output (I/O) devices. Such I/O devices may be coupled with bus 12 via electronic cable interfaces and outside of case 22, which houses much of computing system 10. These I/O devices may include display 24, which may be a cathode ray tube (CRT) display or a flat panel display, keyboard 26 and pointing device 28.

Other I/O devices such as hard copy device 30 and imaging device 32 may also be coupled with computing system 10. For example, hard copy device 30 may take the form of a laser printer, ink-jet printer, or any other number of devices for creating physical media copies of electronic documents or digital images. Likewise, imaging device 32 may take the form of a flatbed scanner, a line scanning device or a copier system with digital image scanning capabilities. The invention is, of course, not limited to these specific I/O devices, and many alternatives exist. Furthermore, hard copy device 30 and imaging device 32 may be integrated and include other functionality such as facsimile transmission capability.

Figure 2:
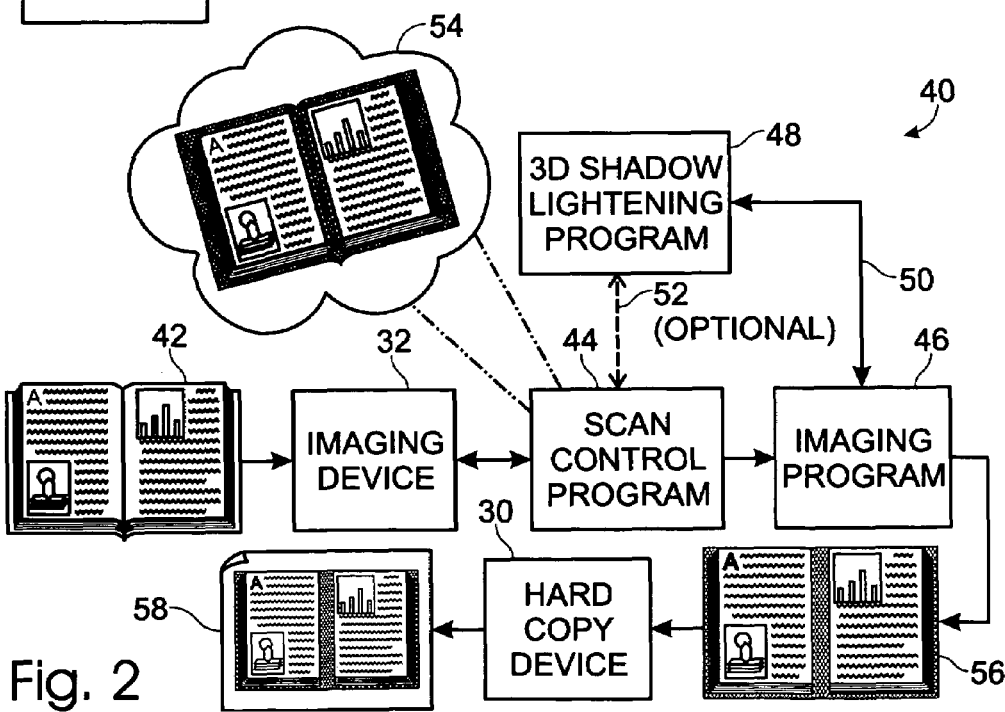
FIG. 2 is a is a block diagram illustrating an image processing system configured for processing an image in accordance with an embodiment of the invention.

FIG. 2 illustrates an image processing system 40 in accordance with the invention. For this embodiment, imaging device 32 may scan original document 42. Scanning of original document 42 may be controlled by scan control program 44. Scan control program 44 thus may communicate, from imaging device 32 to imaging program 46, electronic information including digital image 54 of original document 42. Three-dimensional (3D) shadow lightening program 48 may then operate in conjunction with imaging program 46 via interface 50 to lighten 3D shadows included in digital image 54, as will be discussed in further detail below. Prior to lightening the 3D shadows, shadow lightening program 48 may correct skew and crop digital image 54, as will also be discussed further below. Such image processing of digital image 54 may result in processed digital image 56. It is noted that intermediate digital images may be employed during such image processing.

As one alternative to the foregoing, shadow lightening program 48 may cooperate with scan control program 44 via optional interface 52. For example, initial identification of 3D shadows may be accomplished via optional interface 52, though the invention is not so limited. This identification may then be employed by shadow lightening program 48 to lighten these shadows in cooperation with imaging program 46 via interface 50.

After such image processing, processed digital image 56 may then be communicated to hard copy device 30. Hard copy device 30 may, in turn, create a physical media copy 58 of digital image 56. Such physical media copies are discussed in further detail below.

Figure 3:
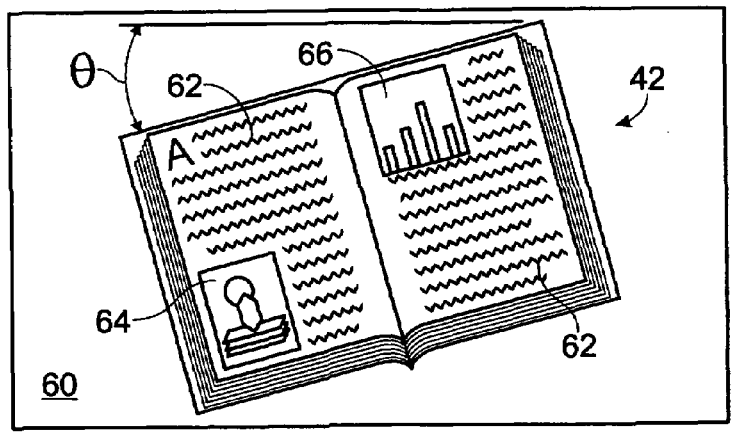
FIG. 3 is a drawing illustrating a skewed image of a book on a scan surface from which a digital image may be created.

FIG. 3 illustrates an original document 42 as it may appear on a scanning surface 60 of imaging device 32. As depicted in FIG. 3, original document 42 takes the form of two pages of a bound book, though other document sources exist. Original document 42 may include text portions 62 and non-text portions 64 and 66. Original document 42 is shown skewed by angle θ on scan surface 60. Scanning original document 42 by employing imaging device 30 may create digital image 54, as was previously described. Digital image 54 may include one or more 3D shadows, as will now be discussed.

Figure 4:
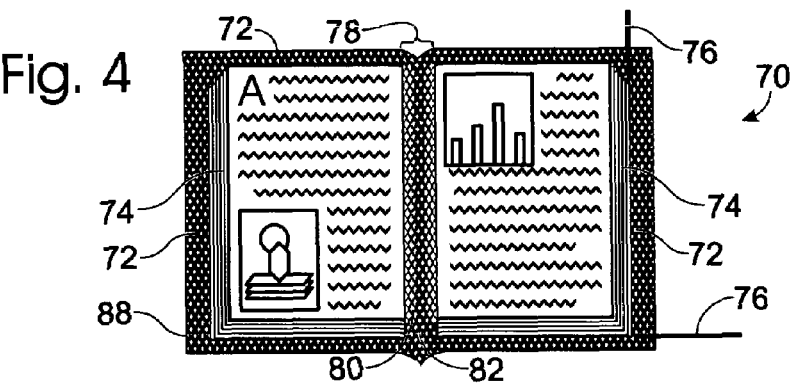
FIG. 4 is a drawing illustrating a digital image of the book depicted in FIG. 3, including three-dimensional (3D) shadows, after correcting skew and cropping the digital image in accordance with an embodiment of the present invention.

In this regard, FIG. 4 is a drawing illustrating digital image 70, which is a modified version of digital image 54 after de-skewing and cropping, as will be discussed with respect to FIG. 6. Digital image 70 may be termed an intermediate digital image, as was previously indicated. Digital image 70 may include perimeter shadow 72, page fanning shadows 74 that may be bounded by a page edge perimeter 76, and binding shadow 78. These shadows may occur as a result of page curvature, varying distance of original document 42 from scan surface 60, and light reflection angles. Furthermore, binding shadow 78 include lighter portion 80 and darker portion 82 due to the physical characteristics of the binding of original document 42 and may bisect, or divide, digital image 70

Figure 5:
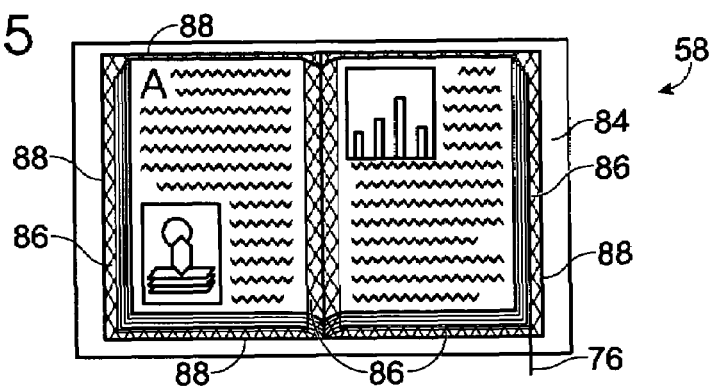
FIG. 5 is a drawing illustrating a physical media copy of the digital image depicted in FIG. 4 after processing the digital image in accordance with an embodiment of the present invention.

In FIG. 5 a processed digital image is shown printed on media 84 to produce physical media copy 58, as was previously discussed. Media 84 may be paper, transparency or any other print media. In this regard, processed image 56 may be printed on the surface of print media 84 via hard copy device 30. It will be appreciated, however, that processed image 56 may be otherwise presented or displayed.

In accordance with the invention, processing digital image 54 by employing shadow lightening program 48 may produce lightened shadow 86 corresponding with perimeter shadow 72 and binding shadow 78. The image may also be cropped along image crop boundary 88, as is discussed below. Additionally, page fanning shadows 74 may be lightened along with perimeter shadow 72 or, alternatively, may be lightened separately or not at all.

Figure 6:
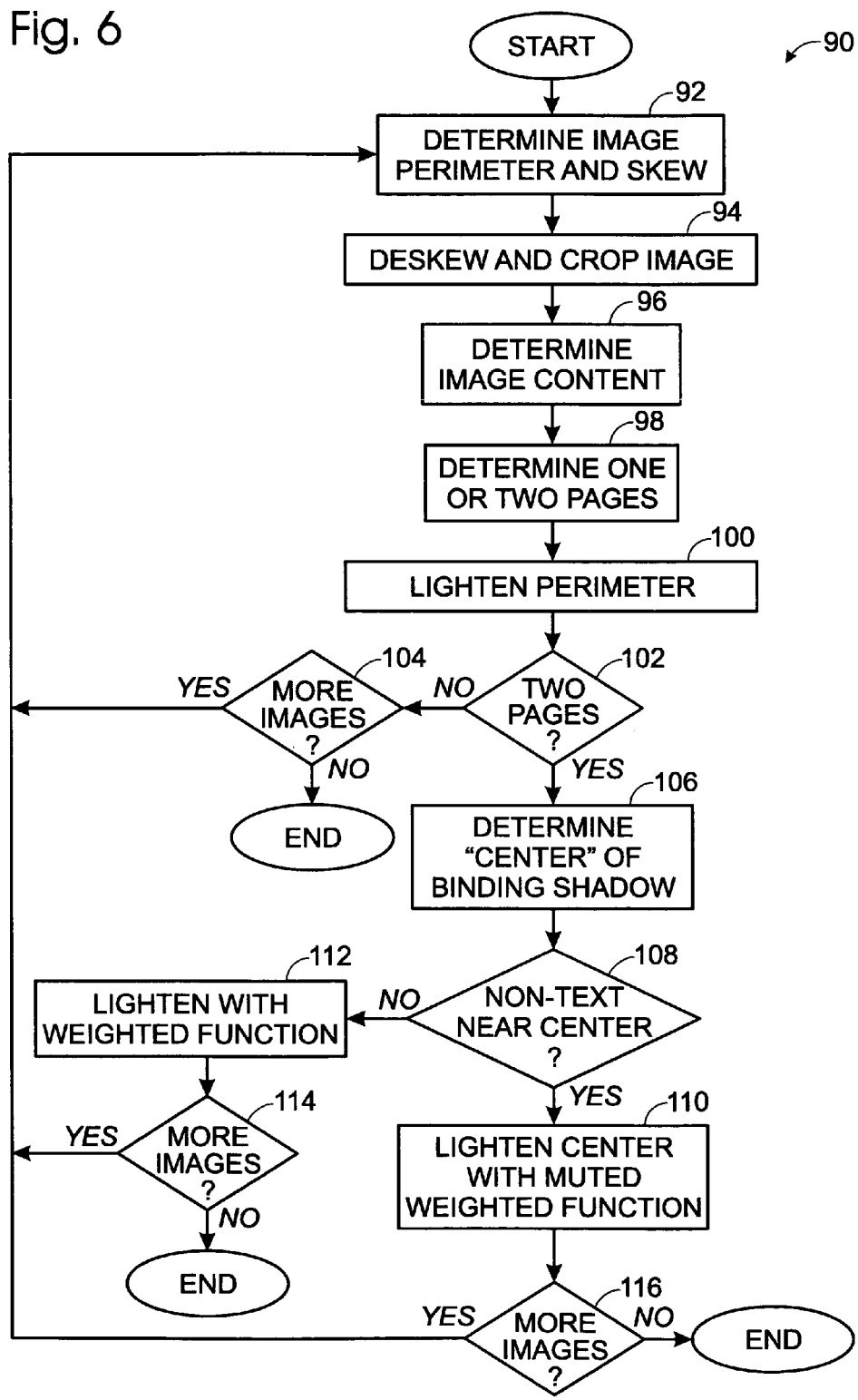
FIG. 6 is a flowchart illustrating a method for 3D shadow lightening and image processing in accordance with an embodiment of the invention.

FIG. 6 illustrates a method 90 of processing digital images in accordance with the invention. Such methods may be included, for example, in shadow lightening program 48. In method 90, image crop boundary 88 of digital image 54 may be determined along with any corresponding skew of that image at 92. Such techniques for cropping, determining image skew, as well as de-skewing digital images are described in patent application Ser. No. 09/546,110, titled IMAGE PROCESSING SYSTEM WITH AUTOMATIC IMAGE CROPPING AND SKEW CORRECTION by C. Chi Jia et al., the disclosure of which is herein incorporated by reference. application Ser. No. 09/546,110 is assigned to the assignee of the current invention. In the exemplary embodiment, by employing such techniques, image crop boundary 88 may be defined at an outer edge of perimeter shadow 72 and skew of original document 42 by angle 68 may be determined at 92. The image may then be de-skewed and cropped along image crop boundary 88 at 94 to produce digital image 70.

At 96, content of original document 42 in corresponding digital image 70 may be determined, typically using method and apparatus as described in patent application Ser. No. 09/545,223, titled METHODS AND APPARATUS FOR ANALYZING AN IMAGE AND FOR CONTROLLING A SCANNER by J. Fian et al., the disclosure of which is herein incorporated by referenced. application Ser. No. 09/545,223 is also assigned to the assignee of the current invention. Briefly, in the exemplary embodiment, text portions 62 of original document 42 are identified and all other portions are treated initially as non-text portions, such as 64 and 66. In this regard, any 3D shadows included in digital image 70 may be initially identified as non-text portions until further processing by shadow lightening program 48 determines a boundary for those shadows. Orientation of text portions 62 may also be determined at 96, and this orientation may be employed as is discussed below.

Operations 98, 100 and 106-112 of method 90 will be discussed in detail below with respect to FIGS. 7-13 and, therefore, are only briefly discussed with respect to FIG. 6. In this regard, text orientation information determined at 96 may be employed at 98 to determine whether original document 42 is a single page or two pages. If it is determined that original document 42 is a single page, lightening binding shadow 78 would typically not be performed as such a shadow would typically not be present. Additionally, text orientation information may be employed for use with optical character recognition (OCR) techniques.

At 100, perimeter shadow 72 may be lightened, using techniques that will be discussed with respect to FIGS. 8 and 9. At 102, if digital image 70 is determined not to be two pages at 98, method 90 may then either process more images as determined at 104, or end. If digital image 70 is determined to be two pages, an associated binding shadow may be lightened at 106-112, such as is described further with respect to FIG. 10. For this embodiment at 106, the "center" of binding shadow 78 may be determined. In this context, "center" means the location of the binding, which may not be the physical center of the shadow associated with it in the case of an asymmetric shadow.

Based on the image content determined at 96, and based on determination, at 108 as to whether or not non-text portions of digital image 70 are within a predetermined distance of the determined binding location, such as non-text portion 64, binding shadow 78 may be lightened using various approaches. For example, if such non-text portions are not present within that predetermined distance, such as non-text portion 64, binding shadow 78 may be lightened at 110. Alternatively, if such non-text portions are present within that predetermined distance, such as non-text portion 66, binding shadow 78 may be lightened at 112. At 110, a lightening function, such as the lightening function used to lighten perimeter shadow 72, may be employed to lighten binding shadow 78. Typically, that lightening function would be weighted based on a relative distance from the determined binding location. This weighting, as will be discussed in more detail below, may produce a more uniform shadow lightening in processed image 56.

Alternatively, at 112 a "muted" lightening function may be applied to lighten binding shadow 78. This "muted" function may also be weighted based on the relative distance from the determined binding location. In this context, "muted" means the lightening function will result in less shadow lightening than the function employed at 110, for example. Such a function may be applied when non-text portions are within a predetermined distance from an established binding location so as not to inadvertently lighten, and make illegible, image content as opposed to 3D shadows.

Figure 7:
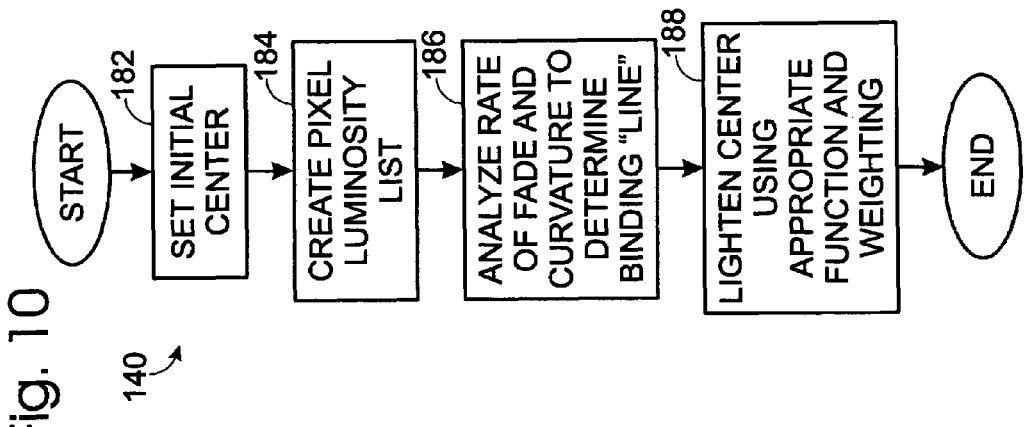
FIG. 7 is a flowchart illustrating a method for determining whether an original document is two pages of a bound volume in accordance with the invention.

FIG. 7 illustrates a method 120 that may be employed to make a determination as to whether digital image 70 was created from a one or two page original document 42. As depicted in FIG. 7, the presence of an image portion with the characteristics of binding shadow 78 may be determined at 122. At 124, this image portion may then be compared with an earlier determined text orientation of text portions 62 to determine if the text orientation is normal to that image portion. This comparison may result in a conclusion that original document 42 is two pages, or may be inconclusive. If the determination is not conclusive, the image portion with the characteristics of binding shadow 78 may be further compared, at 128, with perimeter shadow 72, if such a perimeter shadow exists.

For example, the comparison may include comparing text orientation with perimeter shadow 72 to determine whether that orientation is normal to a portion of perimeter shadow 72 with which it is being compared. Basically comparisons of the various portions of digital image 70 are made to determine whether characteristics similar to those depicted in FIG. 4 are present. This comparison may result in a determination as to whether original document 42 is two pages or some other type of document. The method depicted in FIG. 7 would typically not determine the exact page configuration of original document 42 if it is not two pages. The invention is, however, not limited in scope in this respect.

Figure 8:
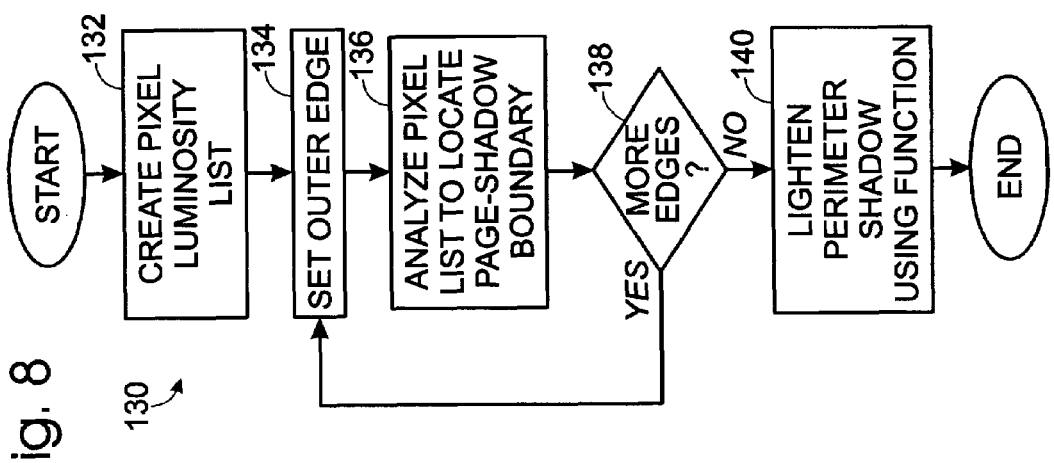
FIG. 8 is a flowchart illustrating a method for perimeter shadow detection and lightening in accordance with an embodiment of the invention.

FIG. 8 illustrates a method of lightening a perimeter shadow in accordance with the invention. In 130, a pixel luminosity list for digital image 70 may be created at 132. Such a list may include luminosity values for the pixels that make up digital image 70. Luminosity values may be measured using a normalized predetermined scale with black being quantified as "0" and white being quantified as "1". At 134, an outer edge of perimeter shadow 72 may be set. This edge would typically be one of the edges of image crop boundary 88. At 138, a linear analysis may then be performed on the pixel luminosity list created at 132. Such a linear analysis, discussed in further detail below with respect to FIG. 9, may include comparing luminosity values for adjacent pixels typically normal to the selected edge of image crop boundary 88 to determine changes in luminosity gradients that may indicate an inner edge of perimeter shadow 72. A determination may then be made as to whether an analysis from all edges of image crop boundary 88 has been performed at 138. If additional edges remain to be analyzed, a next edge may be set at 134, and the linear analysis described above may be repeated for each edge of perimeter shadow 72.

In the event that an accurate determination of an inner edge of perimeter shadow 72 is not made using a linear analysis due to, for example, curvature of binding shadow 78, a pixel proximity analysis may be performed at 136. Such an analysis, which is discussed further with respect to FIG. 9, may include a comparison of luminosity values for all neighboring pixels starting at image crop boundary 88 and moving inward toward the center of the digital image. Therefore, gradients may be established in at least eight directions for each pixel.

Once inner edges, which may be established at page edge boundary 76, and outer edges, such as image crop boundary 88, have been established for perimeter shadow 72, a lightening function may be applied to the pixels contained between the two edges to lighten this shadow. Such lightening functions may vary, and will be discussed in more detail below.

Figure 9:
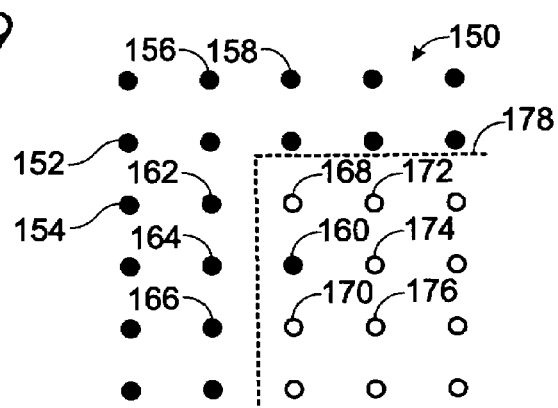
FIG. 9 is a drawing illustrating a pixel arrangement that may be included in a 3D shadow as depicted in FIG. 4.

Referring to FIG. 9, a simplified pixel arrangement 150 is illustrated. In this illustration, image crop boundary 88 may be parallel with rows 152 and 154 in the horizontal, and columns 156 and 158 in the vertical. In such a situation, a liner analysis, as discussed above, may include comparing, for example, the luminosity of pixel 168 with the luminosity of pixels 162 and 172. Gradient changes in luminosity values of such pixels may be evaluated, and an edge, such as perimeter shadow inner edge 178 may be located and established. For this simplified illustration, pixel 162 may have a luminosity of "0", while pixels 168 and 172 may have a luminosity of "1". This may indicate that the location of perimeter shadow inner edge 178 should be established between columns 156 and 158, for the vertical edge. However, analysis along the entire outer edge would be typically be conducted, and an inner edge established based on a statistical analysis of determined gradient changes along, and normal to the outer edge. Likewise, a proximity analysis, as discussed above, may include comparing the luminosity of pixel 160 with the luminosity of pixels 172-176. In this example, perimeter shadow inner edge 178 may be established between columns 156 and 158 in the vertical and rows 152 and 154 in the horizontal.

Figure 10:
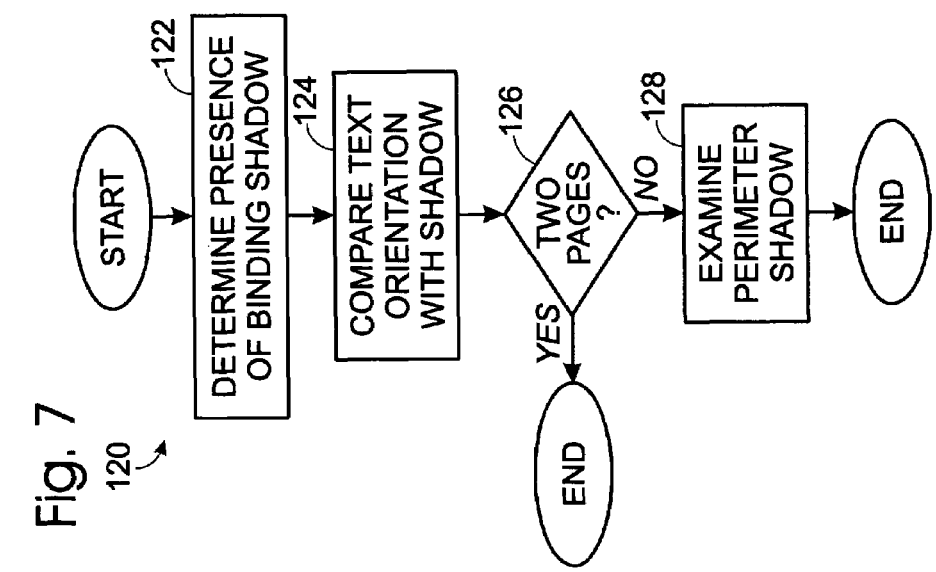
FIG. 10 is a flowchart illustrating a method for binding shadow detection and lightening in accordance with an embodiment of the invention.

FIG. 10 illustrates method 180 that may be employed to determine a binding location and lighten binding shadow 78, as has been discussed above. At 182, an initial center of binding shadow 78 may be set. This initial center is typically established at a geometric center of digital image 70. A pixel luminosity list, as was previously described, may be created at 184. At 186, a linear analysis normal to the initial center may be conducted, and if necessary a pixel proximity analysis, to determine the rate of fade of binding shadow 78, and shadow curvature on both sides of the initial center line. Based on such linear and/or pixel proximity analysis, a location for the binding may be determined and edges for binding shadow 78 may be established. Binding shadow 78 may then be lightened at 188 by applying an appropriate lightening function, and weighting that function, as will now be described in further detail with respect to FIGS. 11-13.

FIGS. 11 and 12 depict graphs 190 and 200 illustrating two lightening functions that may be employed, with methods in accordance with the present embodiment of the invention, such as depicted in FIGS. 6, 8 and 10. It is noted that these lightening functions may be interchanged, or other functions may be employed. FIG. 11 is a graph 190 that illustrates output luminance 192 as a function of input luminance 194. The function is represented by curve 196, and may be employed for lightening perimeter shadow 72 and binding shadow 79 when non-text portions are not within a predetermined distance of a binding (such as non-text portion 66 in digital image 70). In this regard, near the origin of graph 190, a luminance of "0" will be lightened to a luminance indicated by the y-intercept of graph 190. In this regard, the lightening function illustrated in graph 190 may be implemented as a look up table for converting input luminance 194 to output luminance 192.

Likewise, FIG. 12 is a graph 200 that illustrates output luminance 202 as a function of input luminance 204 as represented by curve 206. Such a function may be employed for lightening binding shadow 78 when non-text portions are within a predetermined distance of a volume binding in a corresponding digital image. Therefore, near the origin of graph 200, a luminance of "0" will not be lightened. In this regard, the lightening function depicted by curve 206 may lighten 3D shadows to a lesser degree than the function depicted by curve 196. This may prevent inadvertent lightening of non-text image content near a volume binding. The lightening function illustrated in FIG. 12 may also be implemented as a look up table, as was discussed with respect to FIG. 11.

FIG. 13 is a graph 210 illustrating a weighting function that may be employed with embodiments of methods in accordance with the invention such as those depicted in FIGS. 6 and 10. In this regard, a lightening weight 212, or percentage, is shown as a function of relative distance from binding 214, and is represented by curve 216. Relative distances are typically employed, as various widths of binding shadows 78 may be present depending on the particular characteristics of scanned original document 42, which makes using absolute distances impracticable. Line 218 indicates where the determined edge(s) of binding shadow 78 may fall along curve 216. As can be seen, to the right of line 218, some lightening may still occur, as weighting of the lightening function is greater than zero. Such lightening may be advantageous, as it may produce a "smooth" transition from binding shadow 78 to text portions 62 and non-text portions 64 of processed image 56. In this respect a "smooth" transition may be achieved, as abrupt changes in pixel luminosity may be reduced.

While the present invention has been particularly shown and described with reference to the foregoing depicted embodiments, those skilled in the art will understand that many variations may be made therein without departing from the spirit and scope of the invention as defined in the following claims. The description of the invention should be understood to include all novel and non-obvious combinations of elements described herein, and claims may be presented in this or a later application to any novel and non-obvious combination of these elements. The foregoing embodiments are illustrative, and no single feature or element is essential to all possible combinations that may be claimed in this or a later application. Where the claims recite "a" or "a first" element or the equivalent thereof, such claims should be understood to include incorporation of one or more such elements, neither requiring nor excluding two or more such elements.

I claim:

1. A method of image processing to be executed by a computing system comprising:
   acquiring a digital image including a three-dimensional shadow by scanning a document at an imaging device of the computing system;
   determining whether the digital image includes one of: a single page and two pages of the scanned document at a processor of the computing system;
   determining a boundary of the three-dimensional shadow based on whether the digital image includes one of: a single page and two pages of the scanned document at a processor of the computing system; and
   lightening the three-dimensional shadow within the boundary at a processor of the computing system.

2. The method of claim 1, wherein acquiring the digital image includes scanning two pages of a volume having multiple pages and a binding, the volume having been placed on a scanning surface of an imaging device configured to acquire the digital image; and wherein the three dimensional shadow includes a binding shadow associated with the binding of the volume, a perimeter shadow associated with a page perimeter of the volume, and page-fanning shadows associated with page edges of the volume.

3. The method of claim 1, wherein, prior to determining the boundary, processing the digital image further comprises:
   determining an image perimeter of the digital image including a perimeter shadow;
   determining a skew of the digital image;
   de-skewing the digital image;
   cropping the digital image at an outer edge of the perimeter shadow; and
   determining a content of the digital image.

4. The method of claim 3, wherein determining the content of the digital image includes detecting first portions of the digital image containing text, designating the first portions as text image portions, and designating second portions of the digital image as non-text image portions.

5. The method of claim 3, wherein determining the content of the digital image includes determining the presence of a binding shadow by locating a bisecting shadow portion within the digital image; and comparing the bisecting shadow portion with a text orientation of the digital image.

6. The method of claim 5, wherein determining the content of the digital image further includes comparing the perimeter shadow with the bisecting shadow portion and the text orientation.

7. A method of image processing comprising to be executed by a computing system:
   acquiring a digital image including a three-dimensional shadow at an imaging device of the computing system:
   determining a boundary of the three-dimensional shadow by performing at least one of a linear analysis and a proximity analysis on the digital image to determine luminosity gradient changes associated with the three-dimensional shadow and establishing the boundary based on the gradient changes at a processor of the computing system; and lightening the three-dimensional shadow within the boundary at a processor of the computing system.

8. The method of claim 7, wherein the linear analysis includes determining gradient changes by comparing associated luminosity of adjacent pixels of the digital image in at least one of pixel rows of the digital image and pixel columns of the digital image.

9. The method of claim 7, wherein the proximity analysis includes determining gradient changes by comparing associated luminosity of neighboring pixels of the digital image.

10. The method of claim 7, wherein the boundary includes a perimeter shadow boundary associated with a perimeter shadow, the perimeter shadow boundary being determined by establishing an outer edge at a cropped image perimeter for the digital image and establishing an inner edge based on the gradient changes.

11. The method of claim 7, wherein the boundary includes a binding shadow boundary associated with a binding shadow, the binding shadow boundary being determined by:
   establishing a centerline of the digital image;
   determining gradient changes relative to the centerline;
   determining a location of a volume binding within the boundary shadow based on the gradient changes;
   establishing a first and a second binding shadow boundary line based on the gradient changes relative to the determined location of the volume binding; and
   lightening the binding shadow by applying a lightening function and weighting the lightening function based on a relative distance from the determined location of the volume binding.

12. The method of claim 11, wherein a first lightening function is employed as a result of the digital image having a non-text image portion within a threshold distance of the determined location of the volume binding, and a second lightening function is employed as a result of the digital image having only text image portions within the threshold distance of the determined location of the volume binding.

13. An article comprising:
   a computer readable storage medium having a plurality of machine-readable instructions, wherein when the instructions are executed, the instructions provide for:
      processing a digital image including a three-dimensional shadow;
      correcting a skew of the digital image;
      cropping the corrected digital image;
      determining a boundary of the three dimensional shadow of the corrected and cropped digital image; and
      lightening the three-dimensional shadow within the boundary.

14. The article of claim 13, wherein determining the boundary includes performing at least one of a linear analysis and a proximity analysis on the digital image to determine luminosity gradient changes associated with the three-dimensional shadow; and
   establishing the boundary based on the gradient changes.

15. The article of claim 14, wherein the linear analysis includes determining gradient changes by comparing associated luminosity of adjacent pixels of the digital image in at least one of pixel rows of the digital image and pixel columns of the digital image; and the proximity analysis includes determining gradient changes by comparing associated luminosity of neighboring pixels of the digital image.

16. The article of claim 14, wherein the boundary includes a perimeter shadow boundary associated with a perimeter shadow, the perimeter shadow boundary being determined by establishing an outer edge at a cropped image perimeter for the digital image and establishing an inner edge based on the gradient changes.

17. The article of claim 16, wherein the perimeter shadow boundary includes page-fanning shadows associated with page edges of an original source for the digital image.

18. The article of claim 14, wherein the boundary includes a binding shadow boundary associated with a binding shadow, the binding shadow boundary being determined by:
   establishing a centerline of the digital image;
   determining gradient changes relative to the centerline;
   determining a location of a volume binding within the boundary shadow based on the gradient changes;
   establishing a first and a second binding shadow boundary line based on the gradient changes relative to the determined location of the volume binding; and
   lightening the binding shadow by applying a lightening function and weighting the lightening function based on a relative distance from the determined location of the volume binding.

19. The article of claim 18, wherein a first lightening function is employed as a result of the digital image having a non-text image portion within a threshold distance of the determined location of the volume binding, and a second lightening function is employed as a result of the digital image having only text image portions within the threshold distance of the determined location of the volume binding.

20. An image processing system comprising:
   a computing system having a processor coupled with at least one input/output device and an imaging device configured to provide a scanned digital image of a document including a three-dimensional shadow to the computing system for determining whether the digital image includes one of: a single page and two pages of the scanned document, determining a boundary of the three-dimensional shadow based on whether the digital image includes one of: a single page and two pages of the scanned document, and lightening the three-dimensional shadow within the boundary.

21. The image processing system of claim 20, wherein determining the boundary includes performing at least one of a linear analysis and a proximity analysis on the digital image to determine luminosity gradient changes associated with the three dimensional shadow, and establishing the boundary based on the gradient changes.

22. The image processing system of claim 20, wherein lightening includes modifying luminosity of pixels included in the three dimensional shadow based on at least one lightening function and at least one weighting factor.

23. The image processing system of claim 20, wherein the imaging device includes a flatbed scanner.

24. The image processing system of claim 21, wherein the imaging device includes a line scanner.

25. An image processing system comprising:
   a computing system having a processor coupled with at least one input/output device and an imaging device configured to provide a digital image including a three-dimensional shadow to the computing system for processing, the processing including:
      determining a boundary of the three-dimensional shadow wherein determining the boundary includes performing at least one of a linear analysis and a proximity analysis on the digital image to determine luminosity gradient changes associated with the three dimensional shadow and establishing the boundary based on the gradient changes; and lightening the three-dimensional shadow within the boundary wherein lightening includes modifying luminosity of pixels included in the three-dimensional shadow based on at least one lightening function and at least one weighting factor.

26. A method of image processing comprising to be executed by a computing system:

acquiring a digital image including a three-dimensional shadow at an imaging device of the computing system;

determining luminosity gradient changes within the digital image at a processor of the computing system;

establishing a boundary of the three-dimensional shadow based on the luminosity gradient changes at a processor of the computing system; and lightening the three-dimensional shadow within the boundary at a processor of the computing system.

27. An article comprising:

a computer readable storage medium having a plurality of machine-readable instructions, wherein the instructions are executed, the instructions provide for processing a digital image including a three-dimensional shadow, wherein the processing includes determining luminosity gradient changes within the digital image, establishing a boundary of the three-dimensional shadow based on the luminosity gradient changes and lightening the three-dimensional shadow within the boundary.

* * * * *

UNITED STATES PATENT AND TRADEMARK OFFICE
CERTIFICATE OF CORRECTION

PATENT NO. : 7,483,564 B2
APPLICATION NO. : 10/984591
DATED : January 27, 2009
INVENTOR(S) : Charles Chi Jia It is certified that error appears in the above-identified patent and that said Letters Patent is hereby corrected as shown below:

In column 8, line 60, in Claim 7, after "processing" delete "comprising".

In column 8, line 61, in Claim 7, delete "system:" and insert -- system comprising: --, therefor.

In column 8, line 63, in Claim 7, delete "system:" and insert -- system; --, therefor.

In column 10, line 47, in Claim 21, delete "three dimensional" and insert -- three-dimensional --, therefor.

In column 11, line 8, in Claim 26, after "processing" delete "comprising".

In column 11, line 9, in Claim 26, delete "system:" and insert -- system comprising: --, therefor.

Signed and Sealed this

Fourteenth Day of April, 2009

JOHN DOLL
*Acting Director of the United States Patent and Trademark Office*